Oct. 28, 1969 J. G. WILEN 3,475,726
FUNCTION MONITORING CONTROL CIRCUITRY
Filed March 24, 1966
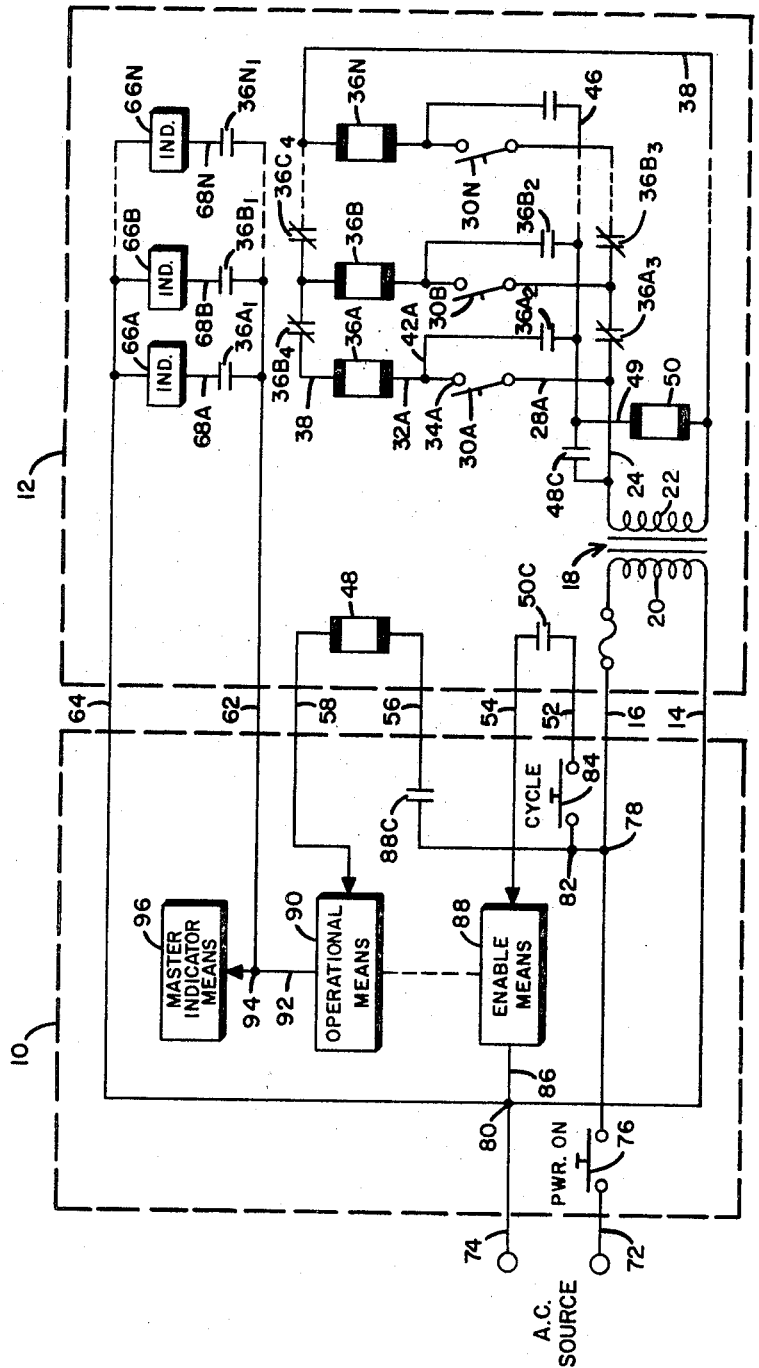
INVENTOR
JAMES G. WILEN
BY Joseph A. Speldrich
AGENT United States Patent Office 3,475,726
Patented Oct. 28, 1969

3,475,726
FUNCTION MONITORING CONTROL
CIRCUITRY
James G. Wilen, Phoenix, Ariz., assignor to Sperry Rand
Corporation, New York, N.Y., a corporation of
Delaware
Filed Mar. 24, 1966, Ser. No. 537,109
Int. Cl. H04q 1/18
U.S. Cl. 340—147                                    12 Claims

ABSTRACT OF THE DISCLOSURE

A device for recording the number of individual machine operations made by a plurality of users wherein a plurality of operator stations are electrically connected in parallel. Each contains electrical means for locking out all stations except the one being utilized during the time that the machine is connected to recorder means associated with the operator station being utilized. Means are also provided to prevent disconnection of the machine from the recorder means while the machine is performing a function.

The present invention is generally directed to control circuitry utilized for monitoring functions performed by apparatus coupled thereto and is the property of Sperry Rand Corporation.

Where apparatus is utilized for performing operations, whatever the nature, it has been found to be advantageous to monitor the function of such in whatever form is desired for the particular application. It is, for example, common to sample information flow in computer systems for enabling the evaluation of information being transferred. The situations in which a monitoring analysis is made of the functions, be it in the computer field, or not, are many and varied. Such monitoring operation may consist of recording the number of transactions or operations performed by a particular apparatus in order to maintain records of such operations for accounting purposes. Likewise, a plurality of recording arrangements may be utilized to maintain records of more than a single function of the apparatus. A particular application for such monitoring techniques is in the copying or reproduction field wherein a single machine may accommodate various departments of a company and personnel therein who require such services. Typically, a company which contains numerous departments, utilizes a central reproduction or copying machine, such as, for example, a 914 copying machine manufactured and marketed by Xerox Corporation. Because of its capabilities in quickly producing copies, it has been found advisable to utilize a central machine servicing many departments. In such reproduction facilities, each sheet of paper represents a cost item which is accounted for by the various departments in accordance with their usage. Accordingly, a charge-back to each department is exacted corresponding to the number of reproduction operations performed. It has been observed in the past that where departments are required to account for their share of usage, only estimates could be made for determining a charge-back to the respective departments. However, inasmuch as each department's reproduction requirements differ, estimates lead to significant errors in cost distributions to those departments whose share of usage represented a smaller proportion than others. To obviate the difficulty of charging back to each department its share of the cost on an estimated basis, novel control circuitry has been designed to be coupled to the Xerox reproduction machine, although no intention is made to restrict the present invention for use therewith only.

Briefly, the control circuitry includes a plurality of operator stations as switches electrically connected in parallel and containing therein means for locking out all stations except the one being utilized. A plurality of circuit energizing and closure means are utilized for locking out all stations except the one being utilized to preclude fraudulent operation and for at the same time conditioning the reproduction machine or other apparatus to enable a recording of the number of reproductions or other functions transacted. In order to couple the control circuitry to the reproduction machine, interface circuitry is incorporated as part of its control circuitry so as to provide an electrical tie in with the machine whose functions are being monitored and to permit the accurate recording of the number of transactions undertaken by the reproduction machine.

Accordingly, it is an object of the present invention to provide fraud proof control circuitry for use with apparatus whose functions are to be monitored.

It is also an object of the present invention to provide control circuitry for recording the number of operations performed by apparatus coupled thereto.

A further object of the present invention is to provide control circuitry for recording at a plurality of stations the number of functions performed by apparatus coupled thereto.

Another object of the present invention is to provide electrical control circuitry including a plurality of individual counting stations operable independently of one another for recording the number of transactions performed by apparatus coupled thereto.

A still further object of the present invention is to provide a plurality of operator's stations independently operable and containing interface circuitry coupled with apparatus whose functions are to be recorded.

Yet another object of the present invention is to provide selectively operable enabling stations for permitting the recording of operations performed by apparatus thereto.

Yet another object of the present invention is to provide a plurality of circuit closure stations coupled to each other in parallel and individually operable to lock out all unused stations for enabling the recording of the number of operations performed by apparatus electrically coupled therewith.

Still another object of the present invention is to provide independently actuatable control circuitry coupled to enabling circuitry for conditioning apparatus electrically coupled thereto to perform operations to be recorded by recording means associated with the present invention.

These and ohter more detailed objects of the present invention will be more evident by the specification and drawings, in which:

The figure illustrates detailed circuitry containing a plurality of operator stations interface with apparatus whose functions are to be recorded by the present invention.

By way of reference to the figure, rectangle 10 enclosed by dashed lines designates an apparatus or machine and box 12 enclosed by dashed lines illustrates the control circuitry of the present invention coupled to the former. Projecting from 10 are leads 14 and 16 connected across the primary 20 of transformer 18. A safety fuse element is included in lead 16 for limiting the amount of current flow through the primary 20 of the transformer. Connected to the secondary 22 is common lead 24 containing a plurality of normally closed switch contact elements $36A_3 \ldots 36N_3$. Lead 28A is connected to an operator's switch closure station 30A. Lead 32A extends from the output of switch contact 34A of the operator's switch closure station and is connected to the relay 36A. Common lead 38 is connected to the other side of the relay and contains therein a plurality of N-1 normally closed switch contact elements $36B_4 \ldots 36N_4$, one such normally closed switch contact $36_4$ being disposed between each operator's station. Common lead 38, containing the normally closed switch contact elements $36_4$, connects to the other side of the secondary 22 of the transformer 18 as illustrated in the figure. Connected to lead 32A of the switch closure is lead 42A containing therein a normally open switch contact element $36A_2$, the lead being connected to common lead 46 containing a single normally open switch contact element 48C. The common lead 46 connects back to lead 24 from the secondary side of the transformer 18. Since each of the operator's stations 30A . . . 30N are electrically similar and similarly tied into the common leads 46 and 24, no further description is deemed necessary. Circuit closures 30A . . . 30N may take the form of a key operated lock switch which functions to close the switch closure only when the key is inserted into the lock switch and rotated to close the contacts thereof. No intention, however, is made to limit the switch to that described. Each operator's station is preferably adapted to accommodate the lock switches, each one of which requires a key different from any of the other lock switches before the circuit closure will be effected, thereby locking out all other unactuated stations. Connected across leads 46 and 38 is lead 49 containing therein a holding relay 50, the function of which will be explained subsequently. When, for example, two or more lock switches are simultaneously closed, the particular station or stations on the left in the figure will be locked out due to the opening of intermediate switch elements $36_4$ between the stations. For example, should switch closures at 30B, 30C, and 30D be simultaneously closed, switch contact elements $36B_4$ and $36C_4$ will open thus permitting only switch closure 30D to be effective. Hence only one station is effective and the other stations effectively locked out to prevent potential fraudulent operation.

Leads 52 and 54 extending from 10 contain therein a normally open interface switch contact element 50C whose contacts are closed upon energization of its holding relay 50. Also extending from 10 are leads 56 and 58 containing therein interface relay 48, which, when energized closes its switch contact element 48C in lead 46. Also extending from 10 are leads 62 and 64 containing therein a plurality of indicators 66A . . . 66N arranged in parallel relation across the leads. Each lead 68A . . . 68N is connected across the leads 62 and 64 and is connected to the indicators 66A . . . 66N and normally open switch contact elements $36A_1 \ldots 36N_1$. The switch contact element $36A_1$, for example, is closed upon the energization of its relay 36A. Similarly, switch contact element $36N_1$ is closed when its relay 36N is energized. The indicators 66 may, for example, be well known counters or the like.

It is to be understood that each of the switch contact elements $36A_1$, $36A_2$, and $36A_3$, operatively connected to their relay 36A associated with station 30A, may be mechanically ganged together as is well known in the art such that when the relay 36A is energized, all of its normally open switch contact elements are closed and all of its normally closed switch contact elements are opened. It is to be noted that station 30A does not require a switch means such as the above described switch contact element $36_4$. However, stations 30B . . . 30N would, in addition to the last mentioned switch contact elements, also include its switch contact element $36_4$ opened upon energization of its relay 36, thus locking out any station to the left of the one actuated in the figure.

Referring now to the circuitry contained within rectangle 10, there are shown power input leads 72 and 74 from an AC supply not shown. Power input lead 74 represents AC common or ground. Power input lead 72 contains an "ON" switch 76 and continues to electrical juncture point 78. Transformer leads 14 and 16 are connected, respectively, to the juncture point 80 to the AC common 74 and through electrical juncture 78. Lead 56, branching from juncture 78, incldes a normally open switch contact element 88C, said lead connecting to relay 48 and to juncture 78. Lead 52, on the other hand, extends from electrical juncture point 82 in lead 56 and contains therein a "CYCLE" switch 84, the lead extending to the normally open switch contact element 50C operatively connected to the relay 50. Lead 54, extending from the normally open switch contact element 50C, is coupled to an enabling means 88. The latter is suitably coupled to the operational means 90 and conditions said operational means in preparation for the function which it is to perform. Lead 86 couples the enabling means to electrical juncture point 80 for return to the AC common. Lead 58 extends from relay 48 to the operational means 90 which performs the desired functions. Output lead 92 extends from the operational means 90 to electrical juncture point 94 and to the master indicator means 96 for receiving an input from the operational means 90 in order to provide an indication of the number of functions performed by the operational means. The master indicator may, for example, be a well known counting device. Lead 62 extends from the electrical juncture point 94 to the indicators 66A . . . 66N and normally open switch contact elements associated therewith. It can be seen that before any indicator can be made operative, its associated switch contact element $36_1$ must necessarily be closed by its correspondingly relay 36. Lead 64 extends from the counter circuit back to juncture point 80 for a return to AC common.

OPERATION

To effect operation of the present invention, initially an operator inserts his specific key into a single circuit closure station such as 30A, for example to close upon contact 34A. Then the operator closes the "ON" switch 76 causing current to be delivered along lead 72, electrical juncture point 78, lead 16, primary 20, lead 14, and back to ground. After current is induced in the secondary 22, it flows along common lead 24 to lead 28A, across the operator's key operated switch closure 30A. Since the switch is closed across 30A, relay 36A is energized which closes normally open switch contact element $36A_2$, closes normally open switch contact element $36A_1$ and opens normally closed switch contact element $36A_3$. Since switch contact element $36A_3$ is opened, no current is delivered to the remaining operator stations 36B . . . 36N. Current flow from relay 36A flows through common return lead 38 to the other side of the secondary 22. Since relay 36A associated with station 30A does not contain a normally closed switch contact element $36_4$, a completed circuit is affected. It is to be noted that the adjacent station, 30B, includes not only its three normally closed and open switch contact elements $36B_1$, $36B_2$, and $36B_3$, but also contains normally closed switch contact element $36B_4$ which latter is opened upon energization of that particular relay 36B. It can be seen that when relay 36B is energized, its normally closed switch contact element $36B_4$ is opened to discontinue a completed circuit back through operator's station 30A, but permits a closed circuit through the remaining stations back to the secondary side of the transformer. Hence, even if switch closure 30A is closed, the open switch contact member $36B_4$ breaks the circuit. Since switch contact element $36A_2$ is connected to lead 32A extending from the operator's switch closure station to relay 36A, it is closed such that current also flows through the lead 42A, along lead 46 to the secondary side of the transformer 22 via lead 49 and relay 50. Since energized holding relay 50 is connected across leads 38 and 46, it pulls or latches its switch 50C to a closed condition.

Then the operator depresses the cycle switch 84 to deliver current through the closed contacts 50C to set the enabling means 88 which conditions the operational means 90 to perform its function. The dotted line between the enable means 88 and the operational means 90 illustrates a coupling functional interrelationship which conditions the latter means. Current returns to ground via lead 86 to juncture point 80. Normally open switch contact element 88C, operatively connected to its enabling means 88, is closed upon the setting of the enable means 88 and permits current flow to relay 48 which in turn latches its switch contact element 48C operatively connected thereto in lead 46. The purpose of introducing a second circuit through lead 42A, switch contact element 36A₂ lead 46, and switch contact element 48C is to assure continued unimpeded operation of the operational means 90 regardless of whether a lock switch at a station has been opened during the function of the operational means 90. In the event that the key or the like is removed from its switch closure 30A, current will continue to flow along lead 46, switch contact element 48C, switch contact element 36A₂, along lead 42A, relay 36A, lead 38, switch contact elements 36B₄ . . . 36N₄ and back to the secondary of the transformer 10. In other words, the second circuit is a safety circuit providing an alternate current path in the event the operator inadvertently or otherwise opens the circuit closure 30A. Accordingly, any attempted fraudulent operation or otherwise is useless.

As the operational means completes its function, current flows along lead 94 to the master indicator 96 to provide an indication thereof. The master indicator may be for a lessor's accounting purposes where the apparatus is supplied on a leased basis, for example. Simultaneously, current flows along conductor 62 and across the now closed switch contact element 36A₁ to provide an indication of such completed function on the indicator 66A. Current return is by way of lead 64 back to ground by way of juncture point 80.

It is to be understood that the present invention is not intended to be limited to the particular circuit configuration illustrated within rectangles 10 and 12. The former circuitry is utilized only for the purpose of connecting the control circuitry of the present invention to some other circuitry to illustrate an operative embodiment. Depending upon the particular application of the control circuitry herein, within rectangle 12, the circuitry within rectangle 10 may be entirely at variance from that actually illustrated. Circuitry in rectangle 10 may be more or less sophisticated depending upon the specific application. Some exemplary uses of the present invention, and by no means intended to be all inclusive include card feeding, voting, and conveyor-sorting applications wherein records of operations performed are highly desirable. The indicators may be counters or other suitable devices for maintaining a record of the operations monitored.

No intention is made to restrict the invention to the incorporation of relay to pull the various switch contact elements. By ganging all of the switch contacts to the station selection closures, the operator himself could create the necessary circuit relationships in order to condition them. As well, the switch contacts could be replaced with gates, for example, coupled to the relays such that upon the latter's energization the gates are placed into a set position to permit current passage. A variety of components, for example, transistors, as well as other components, could perform the fradulent proof operation of the present invention.

Having now, therefore, fully illustrated and described my invention, what I claim to be patentably novel and desire to protect by Letters Patent is:

What is claimed is:

1. Control circuitry for use with apparatus containing operational means whose functions are to be recorded, the control circuitry comprising:
   (A) power supply means;
   (B) a plurality of selection stations coupled to the power supply means, each of said plurality containing an operator's circuit closure means;
   (C) the control circuitry further including:
      (1) first energizable means and operatively connected first closure means associated with each selection station for conditioning a first portion of the control circuitry upon energization of the first energizable means;
      (2) second energizable means and operatively connected second closure means, the second energizable means being connected to the plurality of circuit closure means and to the power supply means, said second closure means being closed upon energization of said second energizable means to permit conditioning of enable and operational means in the apparatus;
      (3) third energizable means and operatively connected third closure means, said third closure means being closed upon energization of said third energizable means to permit functioning of the operational means and to provide through its closure means an alternate electrical path from the power supply means to a selection station whose first energizable means has been energized to permit continued operation of the operational means if an operator's circuit closure means is opened.
   (D) recording means associated with each selection station, said recording means being connected to the power supply means and the operational means for affecting a recording on the recording means upon functioning of the operational means.

2. The invention of claim 1 wherein the plurality of selection stations are electrically connected in parallel with respect to each other.

3. The invention of claim 2 wherein the recording means are electrically connected in parallel with respect to each other.

4. The invention of claim 3 wherein all the energizable means are relays and all the closure means are switches.

5. The invention of claim 4 wherein the second relay is a common relay energized when any one of the selection stations is actuated by closure of the operator's circuit closure means.

6. Control circuitry for use with apparatus containing operational means whose functions are to be recorded comprising:
   (A) power supply means;
   (B) a plurality of independently actuatable selection station means;
   (C) means for electrically coupling said station means to the power supply means;
   (D) a first holding means coupled to said control circuitry and first means operatively connected thereto for conditioning an enable means in the apparatus after power is supplied to said power supply means and after power is delivered across said means operatively connected to the holding means, the conditioning of said enable means further conditioning an operational means in the apparatus for performing a function;
   (E) second holding means connected to the power supply and the operational means and a second means operatively connected to the holding means for providing an alternative electrical circuit from the power supply means to the station means;
   (F) first, second, and third switch means operatively connected to each of said station means, said first switch means locking out all selection stations other than the one actuated, said second switch means being connected to the selection station means to provide the alternative circuit, the third switch means being connected between selection stations to lock out all selection stations not actuated;
   (G) recorder circuit means connected in parallel with respect to each other and connected to the power supply and operational means, said recording circuit means including a plurality of recorder devices;
   (H) and fourth switch means being connected to the recorder devices whereby actuation of said selection station means and the operational means effects an indication on a corresponding recorder device.

7. Control circuitry for use with apparatus containing operational means whose functions are to be indicated comprising:
(A) power supply means;
(B) a plurality of selection circuits connected in parallel and connected to the power supply means;
(C) each of said selection circuits including:
(1) switch closure means;
(2) first energizable means connected to said switch closure means and energized from said power supply means when the switch closure means is closed;
(3) a plurality of switch elements operatively connected to said first energizable means and actuated thereby, said plurality including:
(a) a first normally open switch element electrically connected between an output side of the switch closure means and the first energizable means and connected back to said power supply means, said normally open switch element being closed upon energization of said first energizable means to provide a second electrical circuit from the power supply if said switch closure means is opened;
(b) a second normally closed switch means connected to the power supply means and between respective selection circuits for electrically isolating all selection circuits whose first energizable means is not energized;
(c) a third normally open switch means connected to the apparatus whose functions are to be recorded;
(d) a fourth normally closed switch means connected between the first energizable means of two adjacent selection circuits for permitting current flow back to the power supply means across the switch closure means which is actuated.
(D) second energizable holding means coupled across said power supply means for closing a fifth normally open switch means operatively connected thereto and connected through switch means in the apparatus to the power supply means, said fifth switch means permitting a conditioning of enable and operational means in the apparatus when the switch means in the apparatus is closed;
(E) third energizable means connected to said power supply means and the operational means for closing a normally open sixth switch element operatively connected thereto, said last named switch element coupling all said first switch elements to the power supply;
(F) a plurality of indicating means coupled to the operational means and to the power supply means, said operational means causing an indication corresponding to that selection station whose first means is energized upon completion of a function by the operational means.

8. Control circuitry for use with apparatus containing operational means whose functions are to be monitored and wherein the apparatus contains circuit means cooperating with the control circuitry, the control circuitry comprising:
(A) a plurality of independently operable circuit closure selection station means;
(B) power supply means connected to power switch means in the apparatus and coupled to the plurality of selection station means;
(C) first means operatively connected to each of said selection station means for conditioning said control circuitry to electrically lock out all unactuated selection stations upon the closing of a circuit closure selection station means and the power switch means;
(D) second means associated with the control circuitry and operative upon closure of the power switch means in the apparatus and a selection station means for conditioning third means operatively connected to the second means in the control circuitry, said third means permitting conditioning of fourth means in the apparatus after closing a cycle switch means in the apparatus;
(E) fifth means associated with the control circuitry and coupled to the power supply means and the operational means for conditioning a sixth means operatively connected to the fifth means, said fifth means permitting a function of the operational means;
(F) and indicator means coupled to the operational means and the power supply means for causing an indication whenever the operational means has completed a function.

9. The invention of claim 8 wherein said selection station means are connected in parallel relationship with respect to each other.

10. The invention of claim 9 wherein said indicator means are connected in parallel relationship with respect to each other.

11. The invention of claim 10 wherein each of the first means comprises:
(A) a first holding means;
(B) and a plurality of switch contact means operatively connected to the first holding means.

12. The invention of claim 11 wherein the plurality of switch contact means comprise:
(A) a first normally open switch element electrically connected between an output side of the circuit closure selection station means and the first means and connected back to the power supply means, said first switch element being closed upon energization of the first means to provide another electrical circuit from the power supply means when said circuit closure selection station means is inadvertently opened;
(B) a second normally closed switch means connected to the power supply means and between selection stations, said second switch means being opened upon energization of the first means for rendering functionless all selection stations intermediate the selection station whose circuit closure has been actuated and the power supply means;
(C) a third normally open switch means connected to the indicator means, said third normally open switch means being closed upon energization of the first means for closing a circuit connection to the indicator means;
(D) a fourth normally closed switch means connected between the first means of each selection station and connected back to the power supply means, for rendering functionless all selection stations intermediate the selection station whose circuit closure has been actuated and the power supply means.

References Cited
UNITED STATES PATENTS

| | | | |
|---|---|---|---|
| 3,378,831 | 4/1968 | Metcalf. | |
| 3,399,395 | 8/1968 | Heymann | 340—147 |
| 3,258,747 | 6/1966 | Plate | 340—147 XR |

DONALD J. YUSKO, Primary Examiner

U.S. Cl. X.R.

340—274